United States Patent

[11] 3,523,506

[72] Inventor Robert Arthur Williams
 Scottsdale, Arizona
[21] Appl. No. 695,175
[22] Filed Jan. 2, 1968
[45] Patented Aug. 11, 1970
[73] Assignee Stanray Corporation
 Chicago, Illinois
 a Corp. of Delaware

[54] SMALL HATCH AND COVER IN AN ELONGATED HATCH COVER
 10 Claims, 8 Drawing Figs.
[52] U.S. Cl. ..................................................... 105/377,
 52/53
[51] Int. Cl. ............................................... B61d 39/00
[50] Field of Search .......................................... 220/29;
 105/358, 360, 377; 52/53; 280/5; 296/100;
 105/377, 310

[56] References Cited
UNITED STATES PATENTS

| | | | |
|---|---|---|---|
| 1,226,511 | 5/1917 | Harper ........................ | 220/29 |
| 2,067,994 | 1/1937 | Thwaits ....................... | 220/29 |
| 2,346,636 | 4/1944 | Porter .......................... | 220/29 |
| 2,485,814 | 10/1949 | Cohan .......................... | 220/29 |
| 2,816,683 | 12/1957 | Miers et al .................... | 105/377 |
| 2,999,559 | 9/1961 | Boyer ........................... | 220/29 |
| 3,260,224 | 7/1966 | Pettit et al ................... | 105/377 |
| 3,217,661 | 11/1965 | Kemp ........................... | 105/377 |
| 3,192,877 | 7/1965 | Wright ......................... | 105/360 |

*Primary Examiner* — Arthur L. La Point
*Assistant Examiner* — Richard A. Bertsch
*Attorney* — Sabin C. Bronson ABSTRACT: A hatch cover for an elongated hatch in a hopper car roof in which the cover is composed of a plurality of spaced apart elongated hatch cover sections and a number of relatively small hatch cover sections aligned with and positioned within the spaces between the elongated hatch cover sections. All hatch cover sections are individually swingable and movable back and forth between open and closed position relative to said hatch and have clamping means for securing these hatch cover sections in closed position over the car hatch. The smaller hatch cover sections are associated with the ends of adjacent elongated hatch cover sections to clamp these latter sections to the car hatch at the same time that the smaller hatch cover sections are clamped to the hatch. In another embodiment the elongated hatch cover sections are positioned adjacent to each other in lengthwise alignment and each has a smaller hatch opening therein. Each smaller hatch opening has an associated pivoted and clampable cover so that the smaller hatch opening can be selectively opened or closed relative to the elongated hatch cover section without a corresponding movement of this cover section.

Patented Aug. 11, 1970
3,523,506
Sheet 1 of 3
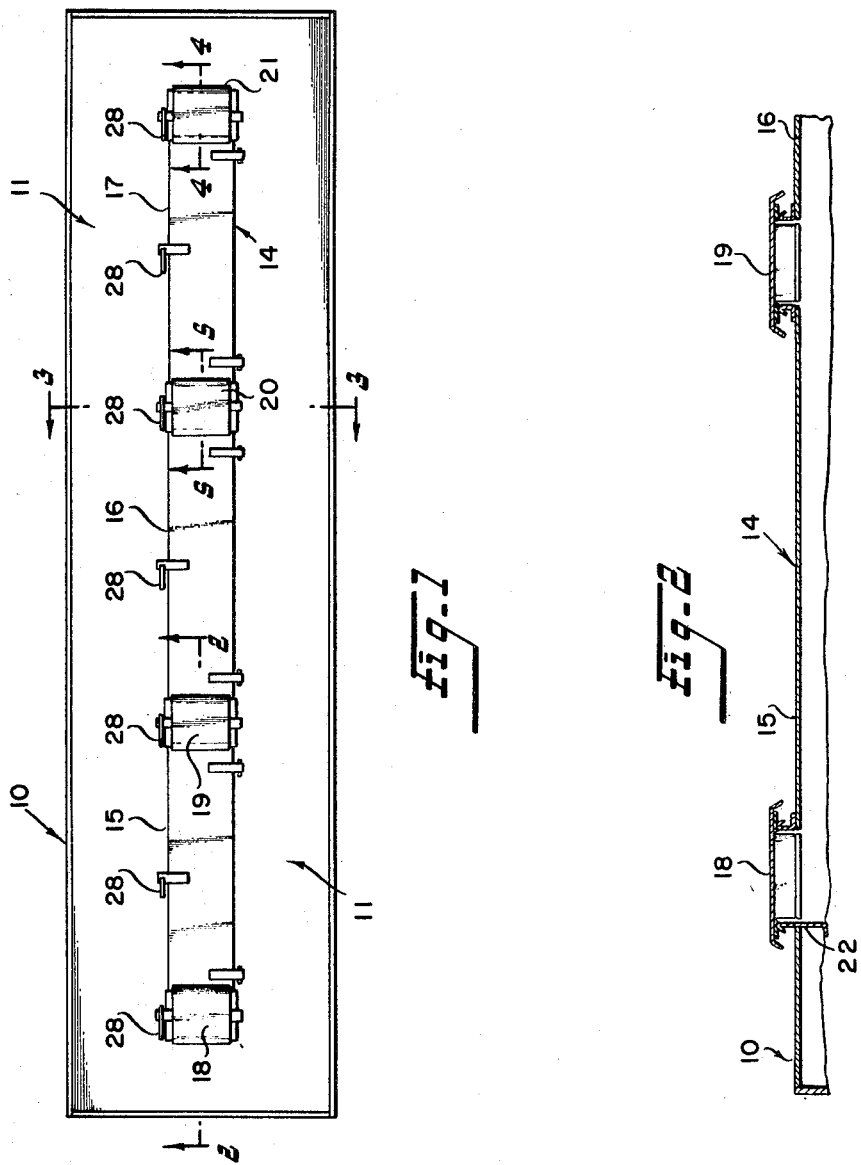
INVENTOR
Robert Arthur Williams
BY
ATTORNEY INVENTOR
Robert Arthur Williams BY  Sabin C. Bronson
ATTORNEY INVENTOR
Robert Arthur Williams BY Sabin C. Bronson

ATTORNEY 3,523,506

SMALL HATCH AND COVER IN AN ELONGATED HATCH COVER

SUMMARY OF THE INVENTION

The invention relates to diverse arrangements of elongated hatch cover sections and relatively smaller hatch cover sections, each of which arrangements may be hingedly mounted on a hopper car roof so as to be associated with an elongated hatch opening into the interior of the car.

In a first embodiment, there are three separate and spaced apart elongated hatch cover sections, each of which is hinged at one side edge thereof to be swingable to closed or open position relative to the car hatch. At the opposite side edge of each of these sections there is a hand-operated lever clamping means whereby each section can be tightly clamped in a closed position over the hatch or can be released so that it can be swung to an open position adjacent the side of the hatch. The relatively smaller hatch cover sections are also hingedly mounted on the car roof in the same manner as the elongated hatch cover sections and are positioned in the spaces between the elongated hatch cover sections to partially overlie the longitudinal ends of the adjacent elongated hatch cover sections. Each of the smaller hatch cover sections also has a clamping means similar to that of the elongated hatch cover sections.

With this arrangement, the relatively smaller hatch cover sections must be freed from their clamp means and swung to open position before the associated elongated hatch cover sections can be moved from a closed position to an open position relative to the car hatch. On the other hand, any number of the relatively smaller hatch cover sections can be selectively opened or closed relative to this car hatch without any change in the position of the elongated hatch cover sections. This arrangement provides for a wide choice of hatch openings into the car.

In a second embodiment of the invention there are relatively smaller hatch openings in the individual elongated hatch cover sections, and these sections are positioned adjacent to each other in alignment. These elongated hatch cover sections are separately hingedly mounted on the car roof relative to the roof hatch and each has its own hand lever clamping system. In addition, a clamp system for the cover of the smaller hatch opening extends to a second clamp system on the car roof. With this arrangement the individual elongated hatch cover sections are released for movement or clamping only by operation of its own clamp system and the second clamp system associated with the smaller hatch cover carried by the particular elongated hatch cover section. On the other hand, the smaller hatch covers can be moved individually at will by releasing the second clamp system and then the smaller hatch cover clamping system. This, of course, does not release the clamp system carried only on the elongated hatch cover sections.

In a third embodiment of the invention, the arrangement is quite similar to the second embodiment, the difference being in that the coaming of the smaller hatch opening in the elongated hatch cover is recessed within the top and bottom bounding planes of the elongated hatch coaming, so that when the small hatch cover is applied, the overall height of the car will not be increased.

BRIEF DESCRIPTION OF THE DRAWINGS

FIGURE 1 is a top plan view showing the combination hatch cover as composed of a number of individual hatch cover sections.

FIGURE 2 is a section taken generally along line 2-2 of FIGURE 1.

DESCRIPTION OF THE PREFERRED EMBODIMENTS

Figure 3:
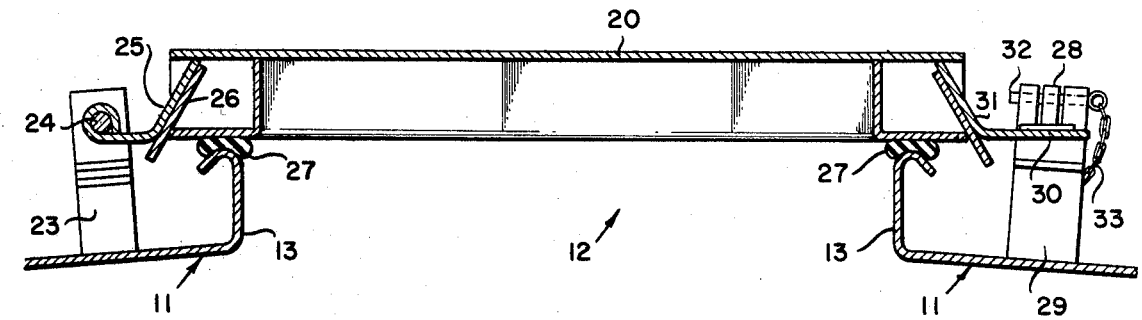
FIGURE 3 is a section taken generally along line 3-3 of FIGURE 1.

In FIGURE 1 the reference numeral 10 generally indicates the upper portion of a railway car, such as a hopper car, which has a plurality of hoppers, not shown. The top of the car is closed with a roof formed by roof sheets generally indicated at 11. Centrally of the roof there is a hatch opening, generally shown at 12 in FIGURE 3, around which there is a hatch coaming 13. This coaming is adapted for cooperation with a combination hatch cover, generally indicated at 14, which includes elongated hatch cover sections 15, 16 and 17 with generally square or rectangular smaller hatch cover sections 18, 19, 20 and 21 that are positioned between the elongated hatch cover sections and at the ends of the hatch as indicated.

Turning to FIGURE 2 of the drawings, smaller hatch cover section 18 is shown as partially overlapping or overlying an end hatch closure plate 22 and the left-hand end portion of the elongated hatch cover section 15. The hatch cover section 19 is shown as overlapping the right-hand end portion of the elongated hatch cover section 15 as well as the left-hand end portion of hatch cover section 16. Such construction will be described in detail later, but it is sufficient to point out at this point that as the combination hatch cover 14 is symmetrical around the transverse center line of the car, the hatch cover sections 20 and 21 are of similar construction.

In FIGURE 3 the smaller hatch cover section 20 is shown positioned on the coaming 13 in a clamped-down position. A pivot bracket 23 is secured to the roof sheet 11 and has a pin 24 on which a plate 25 is pivotally mounted. Plate 25 is secured, as by welding, to the plate 26 on hatch cover section 20 so that this cover section can be raised from and lowered onto the coaming 13 as it is swung around the pin 24. Suitable gaskets 27 are carried on the hatch cover section 20 so that when the hatch cover section is clamped down on the coaming 13 a weather-tight seal is provided.

The clamping means for all of the hatch cover sections can be of conventional form wherein a hand lever 28, a portion of which is seen in FIGURE 3, is mounted for vertical swinging movement about a pivot point, not shown, at one end of the lever. The other end of the lever is designed to be received within the bifurcated end of a lock bracket 29 and as it is manually pressed down in the lock bracket, an intermediate portion of the lever bears against a wear plate 30 carried on metal plate 31. A similar type of clamping means is shown, for example, in the patent to Radey et al, No. 3,259,078.

Plate 31 is secured to the hatch cover section 20 opposite the plate 25 and it is believed obvious that as the pressure is applied downwardly on the hand lever 28, the cover 20 with gasket 27 is urged into tight engagement with the coaming 13. A pin 32 is fastened to bracket 29 by a chain 33 and is adapted to be removably positioned as desired in aligned openings in the bifurcated end of the bracket 29 and the hand lever 28 so as to retain the hatch cover 20 in engagement with the coaming 13 as seen in FIGURE 3. It will be understood that similar pivot and clamp means are also provided for the other smaller hatch cover sections 18, 19 and 21, as well as for the elongated hatch cover sections 15, 16 and 17.

Figure 4:
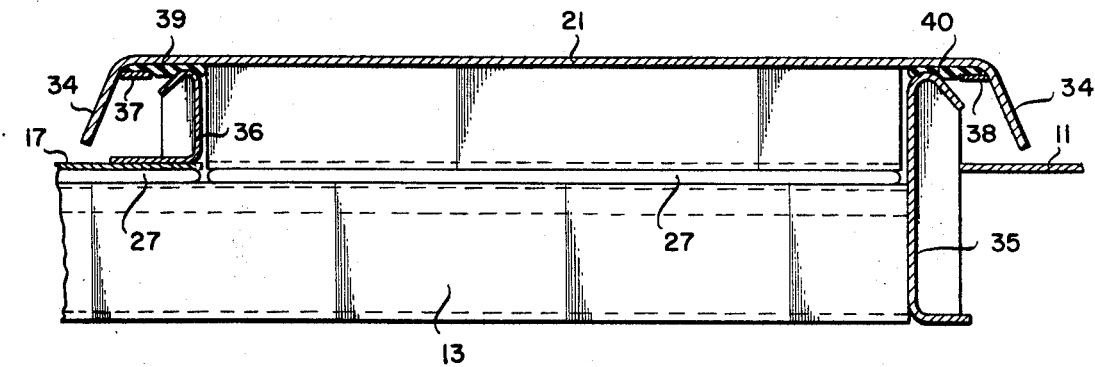
FIGURE 4 is a section taken generally along line 4-4 of FIGURE 1.

Referring now to FIGURE 4 of the drawings, the hatch cover section 21 at one end of the combination hatch cover 14 is shown in more detail. As can be seen, this cover 21 has downwardly turned flanges 34, the left-hand one of which overlies the end of adjacent elongated hatch cover section 17, and the right-hand one of which overlies the roof sheet 11 outside the end hatch closure plate 35. This closure plate 35 is similar to closure plate 22 previously described. A rain deflector plate 36 is secured to the end of the elongated hatch cover section 17. Metal gasket retainer strips 37 and 38 are carried on the underside of the hatch cover 21 adjacent flanges 34 to position gaskets 39 and 40 in a position to contact the rounded tops of the rain deflector plate 36 and the hatch closure plate 35 when the hatch cover 21 is clamped to the coaming 13 by means of the clamping arrangement previously described.

Figure 5:
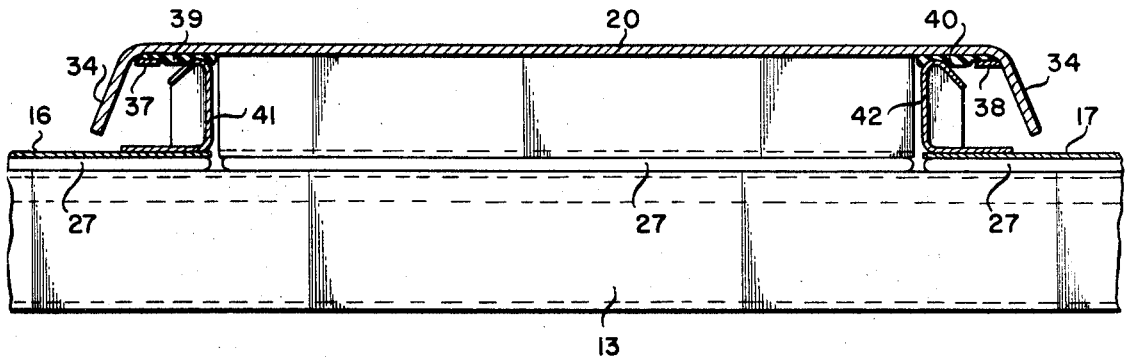
FIGURE 5 is a section taken generally along line 5-5 of FIGURE 1.

In FIGURE 5 the hatch cover section 20 is shown as positioned between the elongated hatch cover sections 16 and 17. The hatch cover section 20 is identical to the hatch cover section 21 previously described and the same reference numerals are used. The construction in FIGURE 5 differs from that previously described in conjunction with FIGURE 4 only in the fact that the hatch cover section is associated with rain deflector plates 41 and 42 on hatch cover sections 16 and 17 instead of with a hatch closure plate 35 and a rain deflector plate 36. Consequently it is believed that no further description of the arrangement of FIGURE 5 is necessary.

The operation of the combined hatch cover 14 on the car hatch will now be described in conjunction with the embodiments as shown in FIGURES 1 to 5, inclusive, of the drawings. From the previous description it is believed obvious that the smaller hatch cover sections 18, 19, 20 and 21 may be opened and closed individually, in such number as may be required, without disturbing the positioning of the elongated hatch cover sections 15, 16 and 17. Thus, the hopper car can be loaded through any desired number of raised hatch cover sections 18, 19, 20 and 21, while the remaining sections of the hatch cover 14 remain in closed position over the hatch.

On the other hand, if the loading of the hopper car requires a bigger opening through the top of the car, then the smaller hatch cover sections can be swung open first to permit a subsequent opening of any selected number of elongated hatch cover sections 15, 16 and 17. Of course if it is desired to open the entire hatch into the car, then all hatch cover sections 18, 19, 20 and 21 are first opened and subsequently all of the elongated hatch cover sections 15, 16 and 17 are opened.

It is important to point out here that not only do the individual smaller hatch cover sections 18, 19, 20 and 21 provide means for opening small selected areas of the car hatch, but also function to clamp the adjacent ends of the elongated hatch cover sections 15, 16 and 17 to the car hatch and car body when they themselves are clamped to closed position over the hatch. Furthermore, while I have shown an arrangement wherein three elongated hatch cover sections are associated with four smaller hatch cover sections, the combination roof arrangement may actually include other desired ratios of smaller hatch cover sections as used with elongated hatch cover sections.

Figure 6:
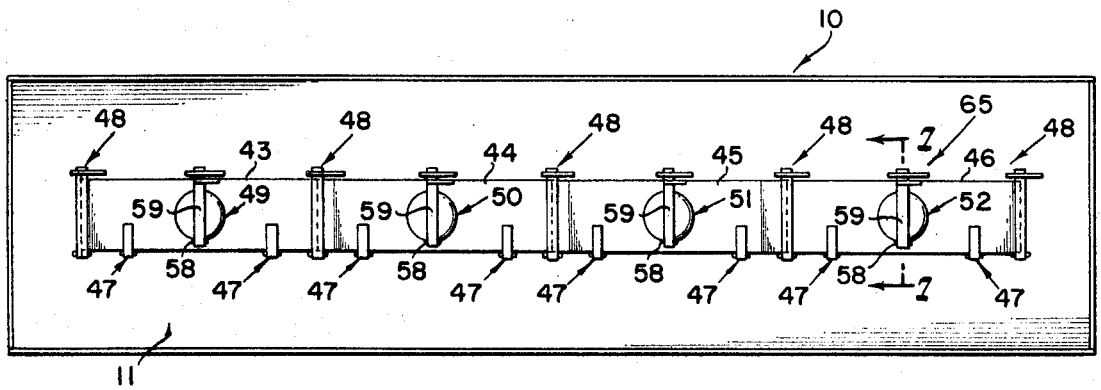
FIGURE 6 is a top plan view of a second embodiment of a combination hatch cover.
Figure 7:
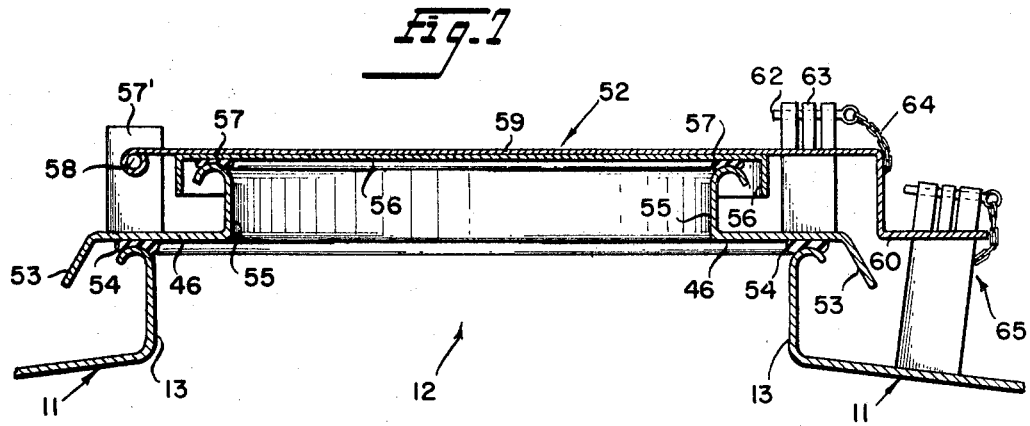
FIGURE 7 is a section taken along line 7-7 of FIGURE 6.

A second embodiment of my invention is shown in FIGURES 6 and 7 of the drawings. In this arrangement there are four elongated hatch cover sections 43, 44, 45 and 46. Each of these sections can be rotated about and clamped in closed position relative to the hatch by pivot and hand lever clamp means of the type previously disclosed in conjunction with the first embodiment of my invention. No further description will be given here but such pivot means are generally indicated at 47 and the hand lever clamp means are generally indicated at 48.

Centrally disposed within each of the elongated hatch cover sections 43, 44, 45 and 46 there are smaller hatch arrangements generally indicated at 49, 50, 51 and 52. Each of these hatch arrangements is identical, and looking at FIGURE 7 it can be noticed that the elongated hatch cover section 46 has downwardly turned side flanges 53 which overlie the roof sheets 11. This elongated hatch cover section 46 carries gaskets 54 to provide a weather-tight seal with a coaming 13 in a manner previously described. A hatch coaming 55 in the elongated hatch cover section 46 is designed to receive a hatch cover 56 that has a gasket 57 which can be pressed to a weather-tight seal between the coaming and cover when the cover is clamped to the coaming.

Carried on the elongated hatch cover section 46 there is a pivot bracket 57' with a pin 58 that pivotally receives one end of strap 59. This strap is secured to the top of the round hatch cover 56 and, as seen in FIGURE 7, extends outwardly past the side flange 53 of hatch section 46 to a point where it is bent downward and then again outward to an end portion which is indicated at 60.

There are two hand lever clamp means, of the type previously discussed, associated with the strap 59 and the end portion 60. The first of these includes the lock bracket 61 mounted on the elongated hatch cover section 46. This bracket can receive a hand lever 62 between its bifurcated end section to selectively urge the strap 59 and hatch cover section 56 into clamping engagement with coaming 55 on elongated hatch cover section 46. A lever restraining pin 63 on chain 64 is provided to hold hand lever 62 in desired position. The second and similar hand lever clamping means is indicated generally at 65 and is mounted on roof sheet 11. The hand lever of this means is designed to be selectively bearable against the end portion 60 of strap 59.

The operation of this embodiment is somewhat different from that of the previously described embodiment. In this latter embodiment the second hand lever clamp means 65 at the center of the hatch and the clamp means generally indicated at 48 at the end of the hatch must be released before a particular elongated hatch cover section can be swung around its hinge means 47. The clamp 61 is not unlocked so that the smaller hatch cover remains clamped to the elongated hatch cover and automatically moves with the elongated hatch cover when the elongated hatch cover is opened or closed. Any number or all of such sections can be moved as desired. On the other hand, if it is desired to open only one or more of the smaller hatch arrangements, then at each smaller hatch arrangement it is necessary to release the hand lever clamping means 65 as well as the clamping means associated with the lock bracket 61. It is obvious that the strap 59 and associated clamps 61 and 65 provide a means for clamping the smaller hatch cover to the elongated cover, as well as a means for clamping the elongated cover to the roof hatch frame.

While I have illustrated in FIGURE 6 the smaller hatch and cover therefor as being round or circular, the same may be square or rectangular without departing from the spirit of the invention.

Figure 8:
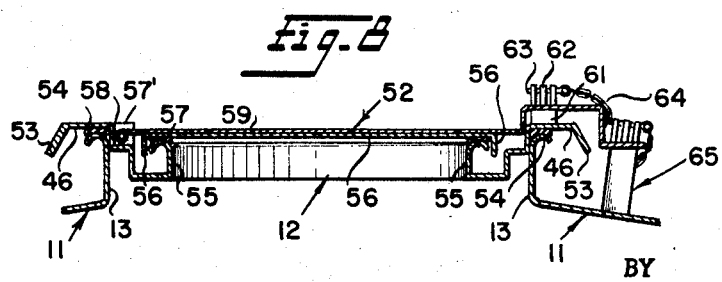
FIGURE 8 is a section, similar to FIGURE 7 but showing the small hatch recessed within the trough hatch.

In FIGURE 8 I have shown a section similar to FIGURE 7 excepting that the trough hatch cover section 46 extends downwardly within the trough hatch 12 and is then turned upwardly forming the coaming 55. This arrangement permits practically all of the small hatch and cover therefor in the elongated hatch cover to extend within the elongated trough hatch 12 and thereby to that extent reduce the overall height of the car. The trend in car construction is toward high volume loading and thus a reduction in overall height without reduction in loading capacity can be important, this being the particular feature of the arrangement shown in FIGURE 8. The same reference characters are used in FIGURES 7 and 8 to indicate the like parts of the two views, the operation being the same.

I claim:

1. A hatch cover arrangement for an elongated hatch in a freight car roof, including a plurality of first elongated hatch cover sections that are spaced apart an appreciable distance in alignment along the length of the hatch, a plurality of second hatch cover sections of less length than said first hatch cover sections and being positioned in alignment with and between said first hatch cover sections, all of said first and second hatch cover sections being hingedly mounted along one side edge thereof to said car roof so as to be swingable back and forth between a hatch covering position and a hatch uncovering position, each of said first and second hatch cover sections also having manually operable clamp means disposed between the other side edge of said hatch cover sections and the car roof whereby the individual hatch cover sections can be selectively clamped in hatch covering position or be unclamped to be swung to a hatch uncovering position, said second hatch cover sections each having end portions that overlie the longitudinally spaced end portions of adjacent first elongated hatch cover sections whereby when any one of said second hatch cover sections is clamped in hatch covering position, said longitudinally spaced end portions of adjacent first hatch cover sections are also clamped in hatch covering position.

2. In a freight car roof having an elongated trough hatch therein, a cover arrangement therefor comprising a plurality of first hatch cover sections and a plurality of second hatch cover sections disposed along the length of said hatch, each of said plurality of hatch cover sections being individually hinged along one side edge and having extended side portions at the opposite side edge thereof, manually operated clamp means associated with respective ones of said hatch cover sections carried on said roof and adapted to receive said extended side portions longitudinally spaced end walls on said first hatch cover sections extending over and being positioned to selectively engage upstanding end wall portions on associated second hatch cover sections whereby when said first hatch cover sections is clamped in engagement with said clamping means the associated second hatch cover sections will be clamped to said hatch.

3. The cover arrangement as in Claim 2 wherein gasket sealing means are carried by said first and second hatch cover sections to engage the side edge walls of said hatch when said hatch cover sections are clamped in closed position thereon.

4. The cover arrangement as in Claim 2 wherein gasket seal means are carried by said first hatch cover sections to engage said upstanding end wall portions on said second hatch cover sections or to engage said end walls of said hatch when said first hatch cover sections are clamped to the hatch and said first hatch cover sections are disposed to provide the end sections of the cover arrangement.

5. The cover arrangement as in Claim 2 wherein said first hatch cover sections are appreciably smaller than said second hatch cover section.

6. The cover arrangement as in Claim 5 wherein said first hatch cover sections are disposed to provide the end sections of the cover arrangement.

7. A cover arrangement for an elongated hatch in a freight car roof including a plurality of elongated hatch cover sections hingedly mounted at one side edge thereof to the car roof and longitudinally aligned in side by side relationship at the hatch opening, clamp means disposed between the ends of said hatch cover sections and said car roof, whereby each of said sections can be selectively clamped to said hatch to cover the same or be unclamped to permit said sections to swing about their hinges to a hatch uncovering position, each of said elongated hatch cover sections having a smaller hatch opening therein, a cover for said smaller hatch opening which is swingably mounted on a pivot mount carried by that particular elongated hatch cover section at one side of said cover, a latch plate or strap extending outward beyond said elongated cover at the other side thereof and being removably received in a first manually operable clamp means carried on said elongated hatch cover section and by a second manually operable clamp means carried on said car roof outwardly of said first clamp means, whereby said dual clamp means can be selectively operated to permit each of the elongated hatch cover sections to be swung toward or away from the hatch with the smaller cover remaining clamped to the smaller hatch opening in said elongated hatch section, or said smaller cover can be unlatched for uncovering said smaller hatch opening in a particular elongated hatch cover section while that elongated hatch cover section is retained in hatch covering position.

8. A cover arrangement as in Claim 7 wherein the hatch openings in the elongated hatch cover sections are circular.

9. The cover arrangement as in Claim 7 wherein gasket sealing means are provided between the elongated hatch cover sections and the elongated hatch and between each cover and associated hatch opening.

10. The cover arrangement as in Claim 7 wherein the smaller hatch openings and covers therefor are recessed within the top and bottom bounding planes of the associated elongated hatch and cover.